(12) United States Patent
Senba

(10) Patent No.: US 6,944,246 B1
(45) Date of Patent: Sep. 13, 2005

(54) DATA PROCESSING DEVICE FOR SWITCHING BETWEEN TERMINAL MODE AND RF MODE WITH A DIGITAL CIRCUIT

(75) Inventor: Hisanori Senba, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 584 days.

(21) Appl. No.: 09/634,501

(22) Filed: Aug. 8, 2000

(30) Foreign Application Priority Data

Sep. 7, 1999 (JP) ................................. 11/253029

(51) Int. Cl.⁷ .............................................. H04L 7/00
(52) U.S. Cl. ................................................... 375/354
(58) Field of Search ................................ 375/354, 316, 375/377; 235/441, 492; 340/825.2, 825.69, 340/825.72, 5.61–5.66, 10.1; 361/737

(56) References Cited

U.S. PATENT DOCUMENTS

| 6,045,043 A * | 4/2000 | Bashan et al. .............. 235/441 |
| 6,199,763 B1 * | 3/2001 | Thuringer et al. .......... 235/492 |
| 6,375,082 B1 | 4/2002 | Kobayashi et al. |

FOREIGN PATENT DOCUMENTS

| FR | 2772534 | 6/1999 |
| JP | 60-218188 | 10/1985 |
| JP | 60-058520 | 3/1988 |
| JP | 3-209592 | 9/1991 |
| JP | 04-023092 | 1/1992 |
| JP | 11-272822 | 10/1999 |
| JP | 11-272823 | 10/1999 |
| JP | 11-272824 | 10/1999 |
| KR | 1999-0078167 | 10/1999 |
| WO | WO98/29830 | 7/1998 |
| WO | WO 98/29830 | * 7/1998 | .......... G06K 19/07 |

OTHER PUBLICATIONS

Korean Office Action dated Aug. 22, 2002, with partial English translation.
European Search Report on European Patent Application No. EP 00 11 9010.
European Search Report dated Aug. 7, 2001.

* cited by examiner

Primary Examiner—Kevin Burd
(74) Attorney, Agent, or Firm—McGinn & Gibb, PLLC

(57) ABSTRACT

An IC card is set to an RF mode by default when drive electric power starts being applied to the IC card. When both a clock signal and a reset signal are applied to respective connection terminals, the IC card switches to a terminal mode. The clock signal and the reset signal that are applied to the respective connection terminals can be detected without the need for an analog circuit such as a comparator. The IC card can be switched between the terminal mode in which only input signals applied to the connection terminals are effective and the RF mode in which only an input signal applied to a radio antenna is reliably effective, with only a digital circuit.

16 Claims, 4 Drawing Sheets

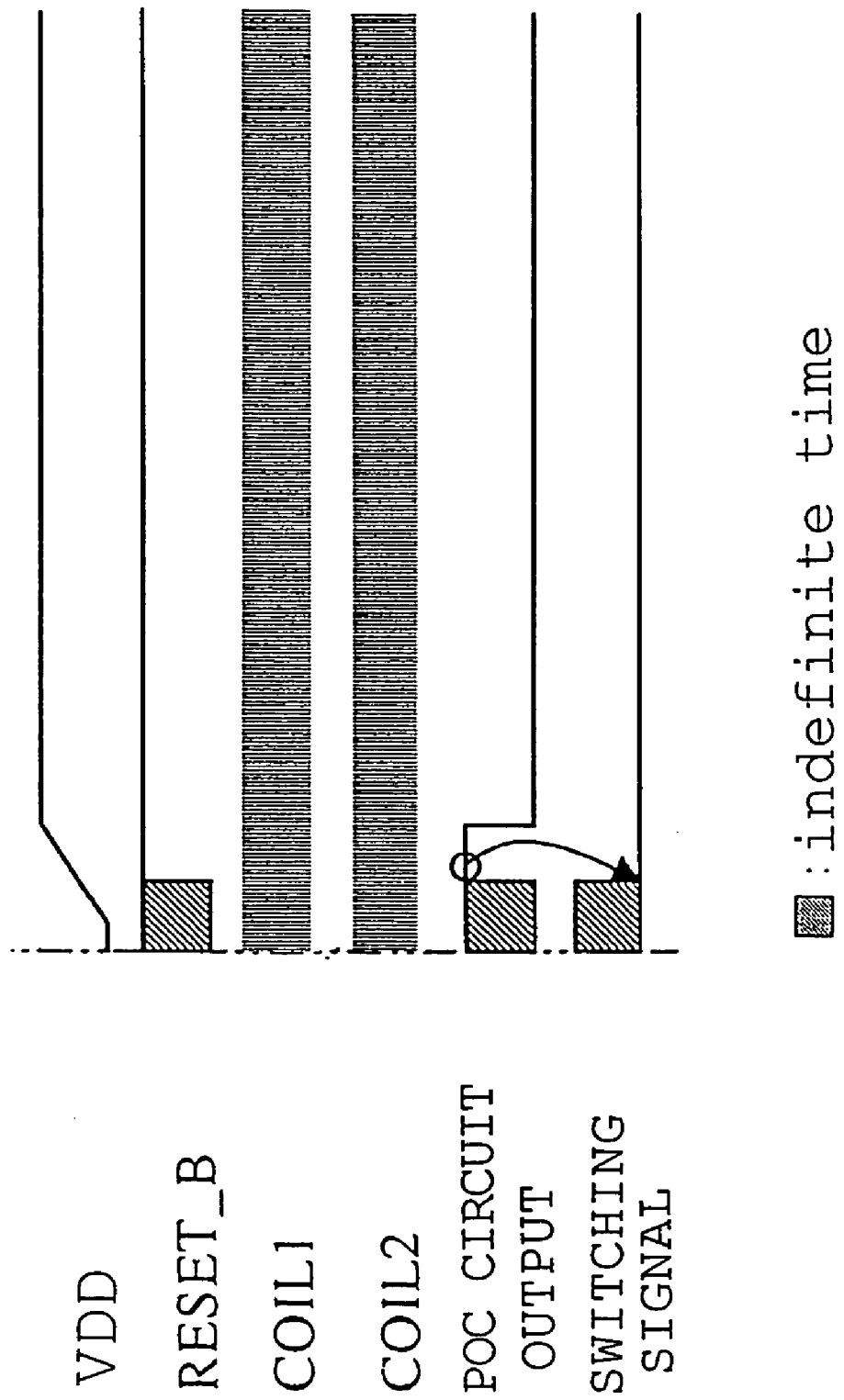

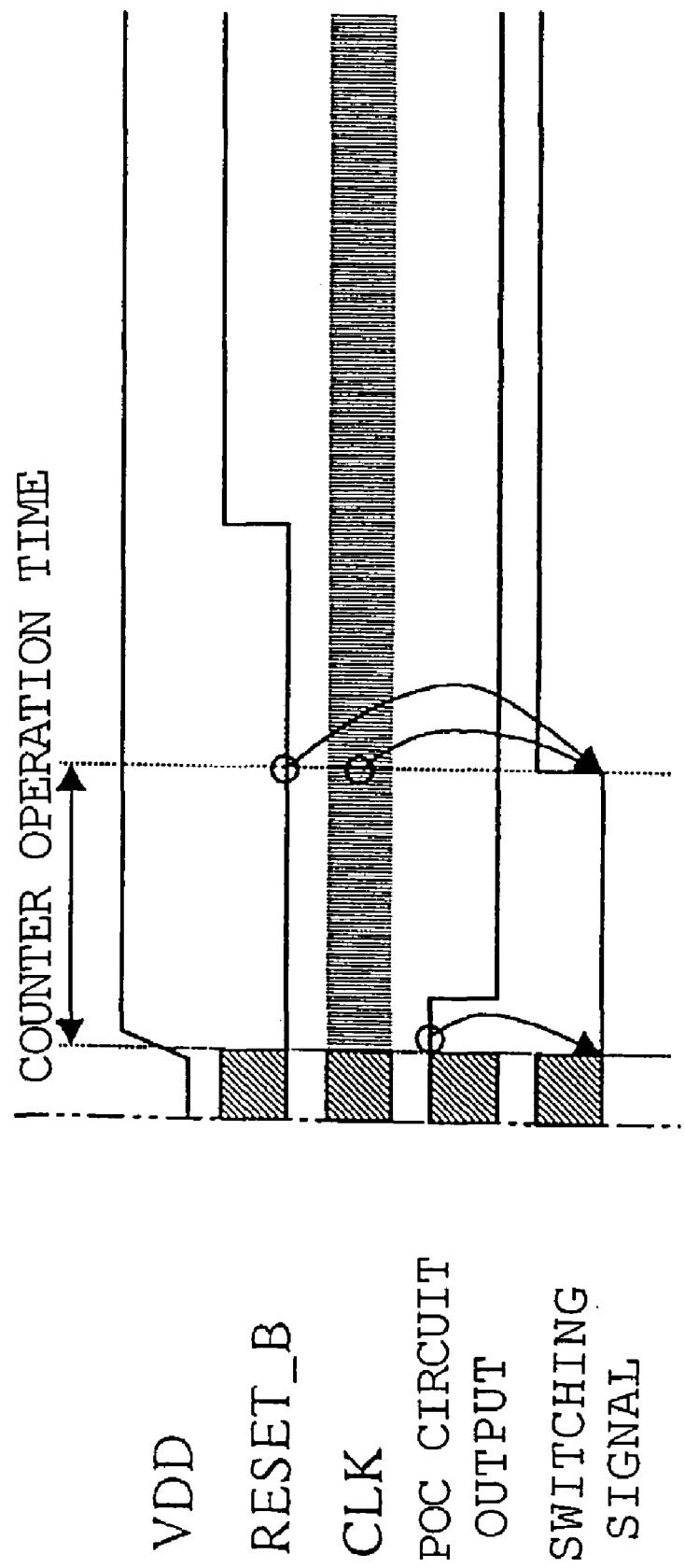

US 6,944,246 B1

DATA PROCESSING DEVICE FOR SWITCHING BETWEEN TERMINAL MODE AND RF MODE WITH A DIGITAL CIRCUIT

BACKGROUND OF THE INVENTION

1. Field of the Invention

The present invention relates to a data processing device for switching between a terminal mode which uses a connection terminal for data communication with an external circuit and an RF (Radio Frequency) mode which uses a radio antenna for data communication with an external circuit.

2. Description of the Related Art

IC cards are available as one type of data processing devices. An IC card comprises a microcomputer in the form of an integrated circuit that is embedded in a plastic card. There have been developed three types of IC cards, i.e., contact cards, contactless cards, and combined cards, that are selectively used depending on the form of signal.

The contact IC cards have a plurality of exposed connection terminals. When a contact IC card is inserted into a card reader, the connection terminals of the contact IC card are brought into individual contact with connection terminals of the card reader. The card reader supplies drive electric power and various signals to the contact IC card, and the microcomputer as a data processing circuit performs various data processings.

The contactless IC cards have one radio antenna for receiving a radio wave transmitted from the card reader. The radio wave from the card reader carries drive electric power and various signals. The IC card extracts the drive electric power and the various signals from the radio wave that is supplied from the card reader via the radio antenna.

The combined IC cards have both a plurality of exposed connection terminals and one radio antenna. A combined IC card is selectively operable in two switchable modes, i.e., a terminal mode in which it operates in the same manner as the contact IC card and an RF mode in which it operates in the same manner as the contactless IC card.

The contact IC card provides better security than the contactless IC card because signals are exchanged between itself and the card reader through a wired connection. The contactless IC card can be handled more easily than the contact IC card since the contactless IC card is not required to be inserted into the card reader.

The combined IC card can be handled easily and provides high security as it can transmit data requiring less security via a contactless connection. As described above, the combined IC card needs to be switched between the terminal mode and the RF mode.

For example, Japanese Patent Laid-Open Publication No. 209592/1991 discloses that the voltage level of drive electric power applied to one of the connection terminals and the voltage level of drive electric power extracted from a received radio wave supplied from the radio antenna are compared with each other, and either of the terminal mode and the RF mode is selected based on the result of the comparison.

Since the voltage levels are generally compared with each other by an analog circuit such as a comparator for mode switching, the mode switching process is performed under analog control. The mode switching process under analog control is problematic in that it is not a clear-cut process and tends to vary due to errors in the fabrication of the combined IC card.

In actual usage of the combined IC card, when unexpected electromagnetic noise is received by the radio antenna, the mode of operation of the combined IC card may possibly switch to the RF mode automatically. If the user, not knowing that the combined IC card is in the RF mode, inserts the combined IC card into a terminal-mode or wired card reader, then the combined IC card may possibly malfunction.

Alternatively, even if the combined IC card inserted in a wired card reader normally operates in the terminal mode, the mode of operation of the combined IC card may switch to the RF mode due to extraneous electromagnetic noise, causing the combined IC card to suffer malfunctioning.

In order to prevent such malfunctioning, the combined IC cards are designed not to operate with radio input signals that do not meet IC card standards. However, because a portable wired card reader is available in the art, a combined IC card thus designed may still be caused to malfunction when the user inserts the combined IC card into such a portable wired card reader that is carried by the user, without recognizing the presence of an RF-mode card reader that is installed nearby.

As described above, when a signal is applied to the radio antenna of a combined IC card and a signal is also applied to the connection terminals thereof at the same time, those simultaneously applied signals may cause the IC card to malfunction and fail. The manufacturer of the combined IC card cannot identify the cause of such malfunctioning and failure because the manufacturer finds it difficult to confirm the environment in which the user uses the combined IC card.

SUMMARY OF THE INVENTION

It is therefore an object of the present invention to provide a data processing device which can perform a reliable control process of switching between a terminal mode and an RF mode.

Another object of the present invention is to provide a data processing device which allows the manufacturer to confirm the environment in which the user uses the data processing device for thereby identifying the cause of a malfunction or failure of the data processing device.

According to one aspect of the present invention, a data processing device has a plurality of connection terminals, at least one radio antenna, a data processing circuit, and a mode selecting circuit. The connection terminals are individually supplied with signals including processing data, a clock signal, and a reset signal, and drive electric power. The radio antenna receives the signals and the drive electric power as one radio wave. The data processing circuit is switchable between a terminal mode in which only the signals supplied to the connection terminals are effective and an RF mode in which only the radio wave supplied to the radio antenna is effective, the data processing circuit being supplied with the drive electric power and the signals. The mode selecting circuit sets the data processing circuit to the RF mode by default in response to the drive electric power starting to be supplied, and switches to the terminal mode in response to the clock signal and the reset signal which are applied to corresponding ones of the connection terminals.

Inasmuch as the clock signal and the reset signal applied to the respective connection terminals can be detected without the need for an analog circuit such as a comparator, the control process for switching between the modes of operation of the data processing circuit can be performed by only a digital circuit. Therefore, the data processing device has a clear-cut control process for switching between the two modes, and the control process is prevented from varying due to errors in the fabrication of the data processing device.

In an embodiment, the mode selecting circuit has mode maintaining means for maintaining the terminal mode until the supply of the drive electric power is stopped. When the data processing device starts being supplied with drive electric power, it is set to the RF mode by default. The data processing device then switches to the terminal mode in response to certain input signals applied thereto. The data processing device remains in the terminal mode until the supply of the drive electric power is stopped. The data processing circuit can operate stably in the terminal mode because it does not switch from the terminal mode to the RF mode during its operation.

In an embodiment, the mode selecting circuit comprises clock counting means and input deciding means. The clock counting means counts clock pulses of the clock signal supplied in response to the drive electric power starting to be supplied, and the input deciding means outputs a switching signal to switch the data processing circuit to the terminal mode when the clock counting means has counted a predetermined number of clock pulses. Since the data processing circuit switches to the terminal mode only when clock pulses are input up to the predetermined number from the start of the supply of the drive electric power, the data processing circuit is prevented from being set to the terminal mode in error by extraneous electromagnetic noise as it is not recognized by clock pulses.

In an embodiment, the input deciding means has data output means for outputting the reset signal as the switching signal when the clock counting means has counted a predetermined number of clock pulses. The data processing circuit switches to the terminal mode when the predetermined number of clock pulses and the reset signal are applied to the data processing device.

In an embodiment, the mode selecting circuit has mode maintaining means for applying the switching signal output by the input deciding means as a dummy clock signal to the clock counting means through a feedback loop. When the dummy clock signal is supplied to the clock counting means, the clock counting means has its output signal fixed, and the mode maintaining means continuously outputs the switching signal for the terminal mode. Because the terminal mode selected by the mode selecting means is maintained until the supply of the drive electric power is stopped, the data processing circuit can operate stably in the terminal mode because it does not switch from the terminal mode to the RF mode during its operation.

The above and other objects, features, and advantages of the present invention will become apparent from the following description with reference to the accompanying drawings which illustrate examples of the present invention.

BRIEF DESCRIPTION OF THE DRAWINGS

FIG. 4 is a timing chart showing various signals produced in the IC card when it is set to an RF mode by default; and FIG. 5 is a timing chart showing various signals produced in the IC card when it is switched to a terminal mode.

DESCRIPTION OF THE PREFERRED EMBODIMENT

Figure 2:
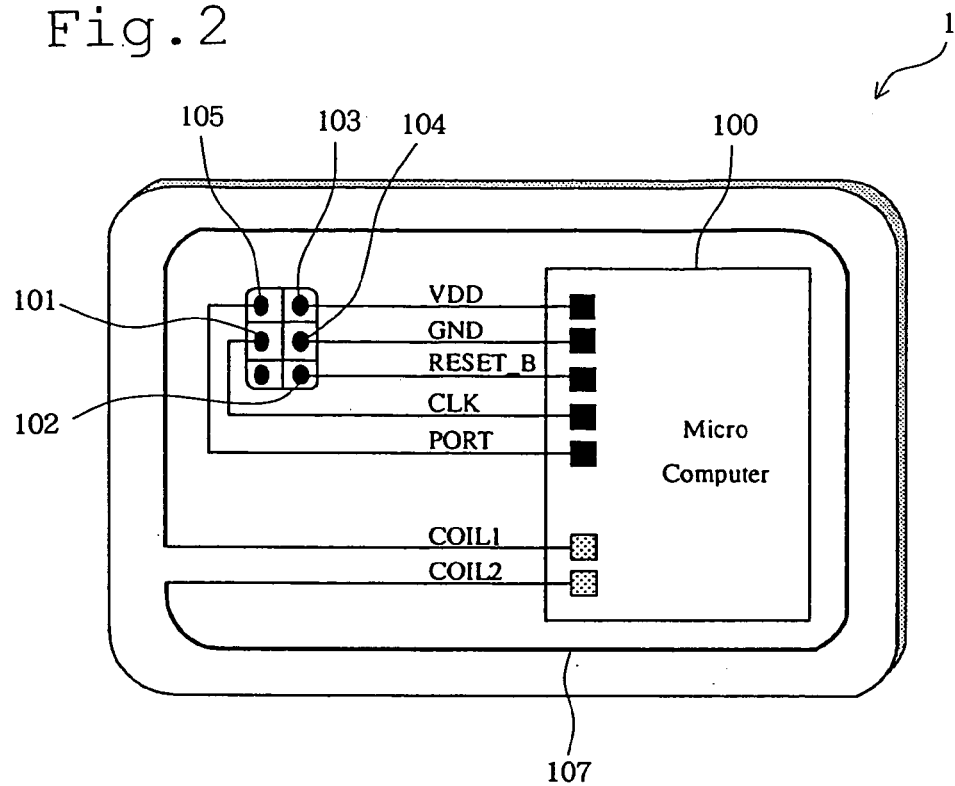
FIG. 2 is a view showing an overall structure of the IC card.

Referring now to FIG. 2, there is shown an IC card 1 constructed as a data processing device according to a preferred embodiment of the present invention.

The IC card 1 is a combined IC card that operates selectively in two modes, i.e., a terminal mode and an RF mode. It IC card 1 is formed as a plastic card that is removably insertable in a wired card reader (not shown) that is used when the IC card 1 is in the terminal mode. The IC card 1 has a microprocessor 100 as its main component.

The IC card 1 also has five connection terminals 101–105 on an outer exposed surface thereof. When the IC card 1 is inserted into a wired card reader, the connection terminals 101–105 are brought into individual contact with and electrically connected to the respective five connection terminals (not shown) in the card reader.

The connection terminal 101 is supplied with a clock signal CLK, the connection terminal 102 with a reset signal RESET_B, the connection terminal 103 with drive electric power VDD, the connection terminal 104 with a ground potential GND, and the connection terminal 105 with processing data PORT.

The IC card 1 also has a radio antenna 107 comprising an inductive coil having opposite ends connected to a microcomputer 100. The microcomputer 100 communicates with a wireless card reader (not shown) with a pair of radio waves COIL1, COIL2 via the radio antenna 107.

Figure 3:
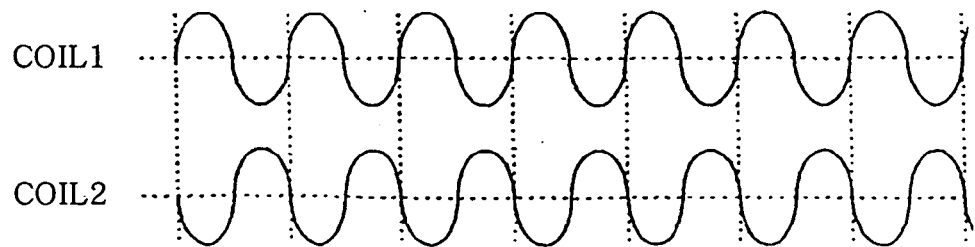
FIG. 3 is a timing chart showing the waveforms of a pair of radio waves.

As shown in FIGS. 3 and 4, the radio waves COIL1, COIL2 handled by the IC card 1 are in accordance with standards of ISO (International Standardization Organization)/IEC (International Electrotechnical Commission) 14443, and contains a clock signal CLK, processing data PORT, and drive electric power VDD that are superimposed.

Various signals applied to the connection terminals 101–105 are in accordance with standards of ISO 7816. As shown in FIG. 5, when the clock signal CLK, the drive electric power VDD, and the reset signal RESET_B start being simultaneously supplied to the connection terminals 101–105, the reset signal RESET_B is initially "0".

When the number of clock pulses of the supplied clock signal CLK reaches 400 or more, the reset signal RESET_B is inverted to "1".

Figure 1:
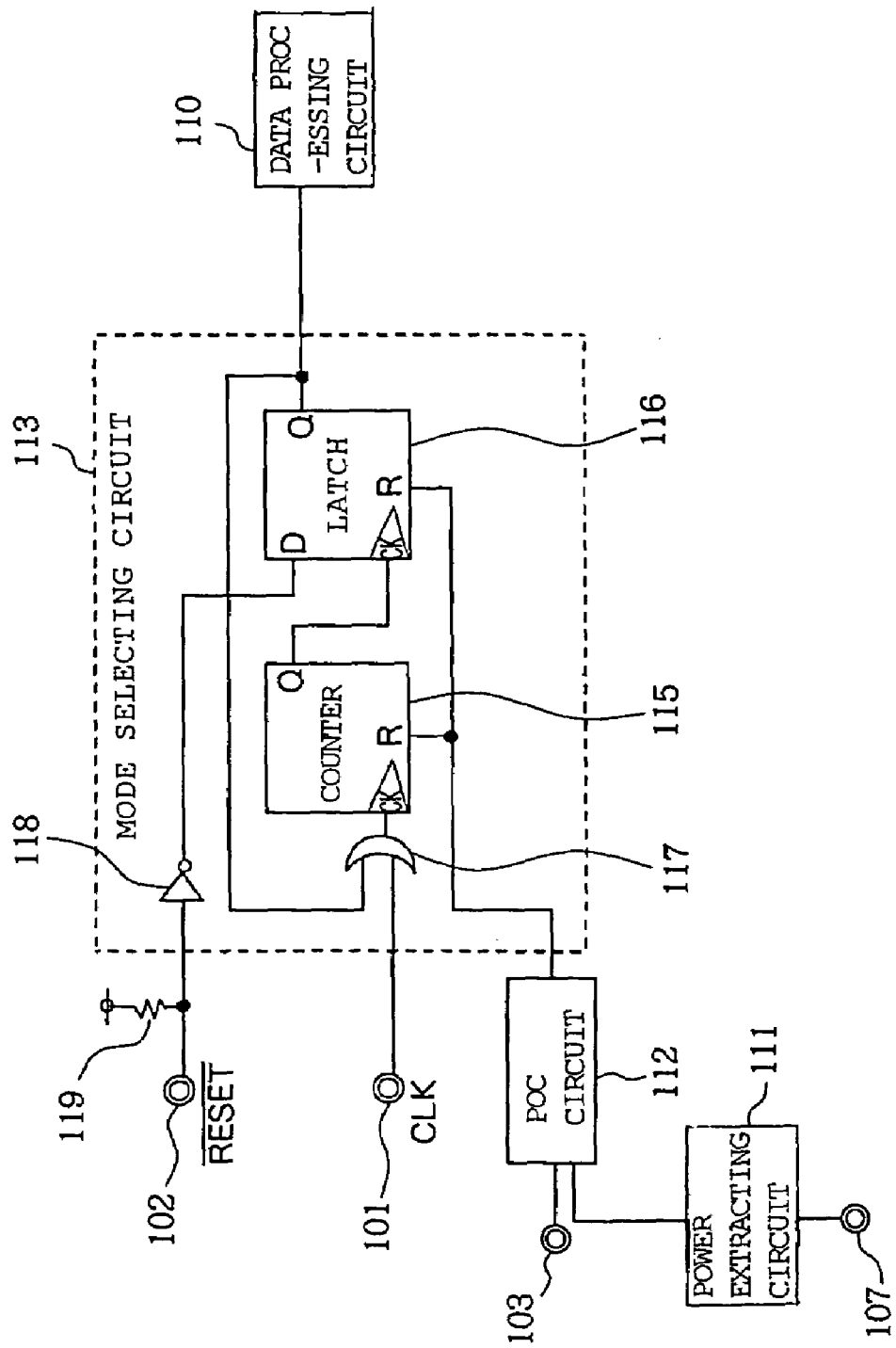
FIG. 1 is a block diagram of a mode selecting circuit of an IC card as a data processing device according to a preferred embodiment of the present invention.

As shown in FIG. 1, the IC card 1 has a data processing circuit 110. The data processing circuit 110 is energized by drive electric power VDD that is supplied via a wired or wireless connection, and performs various data processing on various signals supplied via a wired or wireless connection.

The radio antenna 107 is connected to a power extracting circuit 111 as a power extracting means. A POC (Power On Clear) circuit 112 as a power detecting means is connected to the power extracting circuit 111 and the connection terminal 103.

A mode selecting circuit 113 is connected to the POC circuit 112, the connection terminal 101, and the connection terminal 102. The mode selecting circuit 113 is connected to the data processing circuit 110.

The power extracting circuit 111 extracts drive electric power VDD from a radio wave applied to the radio antenna 107. The drive electric power VDD extracted from the radio wave by the power extracting circuit 111 and the drive electric power VDD applied to the connection terminal 103 are similarly supplied to the data processing circuit 110.

The POC circuit 112 outputs a one-shot POC signal to the mode selecting circuit 113 when the drive electric power VDD supplied from the power extracting circuit 111 or the connection terminal 103 reaches a predetermined voltage. The mode selecting circuit 113 is activated when it is supplied with the POC signal.

The mode selecting circuit 113 comprises a counter 115 as a clock counting means, a latch 116 as an input deciding means, an OR gate 117 as a mode maintaining means, and an inverter 118. The POC circuit 112 is connected to reset terminals of the counter 115 and the latch 116.

The connection terminal 101 is connected to the counter 115. When the counter 115 is reset by a POC signal supplied from the POC circuit 112 upon application of the drive electric power VDD thereto, the counter 115 counts up to 300 clock pulses of the clock signal CLK supplied from the connection terminal 101.

When the latch 116 is reset by the POC signal supplied from the POC circuit 112 upon application of the drive electric power VDD thereto, the latch 116 outputs a switching signal "0" indicative of the RF mode to the data processing circuit 110, as shown in FIG. 4. When the counter 115 indicates a completion of the counting process to the latch 116 while the latch 116 is outputting the switching signal "0" indicative of the RF mode, the latch 116 latches the reset signal RESET_B supplied from the connection terminal 102, and outputs a switching signal.

More specifically, a pull-up resistor 119 is connected to the connection terminal 102. When a potential "0" as the reset signal RESET_B is not applied to the connection terminal 102, the connection terminal 102 is maintained at a potential "1". The potential "1" as the reset signal RESET_B is inverted by an inverter 118, and then applied to the latch 116.

The reset signal RESET_B that is applied via a wired connection is "0" immediately after it starts being applied. When the number of clock pulses of the supplied clock signal CLK reaches 400 or more, the reset signal RESET_B is inverted to "1". Therefore, when the counter 115 has counted first 300 pulses of the clock signal CLK, the reset signal RESET_B is "0".

As shown in FIG. 5, when the counter 115 that has been reset by a POC signal supplied from the POC circuit 112 upon application of the drive electric power VDD thereto indicates a completion of the counting of up to 300 clock pulses of the clock signal CLK to the latch 116, if the reset signal RESET_B from the connection terminal 102 is "0", then the latch 116 outputs a switching signal "1" indicative of the terminal mode to the data processing circuit 110.

When the number of clock pulses of the supplied clock signal CLK reaches 400 or more, the reset signal RESET_B is inverted from "0" to "1". At this time, the reset state of the data processing circuit 110 is canceled. Therefore, the reset state of the data processing circuit 110 is canceled after the switching signal has been determined.

The connection terminal 101 is connected via an OR gate 117 to the counter 115. The latch 116 has its output terminal connected to the OR gate 117, providing a feedback loop for the output signal from the latch 116.

When the latch 116 outputs the switching signal "1" indicative of the terminal mode, the switching signal is applied as a dummy switching signal through the feedback loop via the OR gate 117 to the counter 115.

When the input signal applied to the counter 115 is set to "1", then the output signal from the counter 115 is also set to "1". Therefore, once the mode selecting circuit 113 starts outputting the switching signal "1" indicative of the terminal mode, it keeps outputting the switching signal "1" until the application of the drive electric power VDD is stopped.

The IC card 1 as the data processing device according to the embodiment of the present invention can be switched between the RF mode and the terminal mode. In the RF mode, the IC card 1 communicates with a wireless card reader. In the terminal mode, the IC card 1 communicates with a wired card reader.

Operation of the IC card 1 in the RF mode will be described below. When the IC card 1 is brought closely to the wireless card reader within a given distance therefrom, rather than being inserted into the wired card reader, no input signals are applied to the connection terminals 101–105, but a radio input signal is applied to the radio antenna 107.

The power extracting circuit 111 extracts drive electric power VDD from the radio wave applied to the antenna 107. As shown in FIG. 4, when the drive electric power VDD reaches a predetermined voltage, the POC circuit 112 outputs a one-shot POC signal to the mode selecting circuit 113.

At this time, since no clock signal CLK and no reset signal RESET_B are applied respectively to the connection terminals 101, 102, the latch 116 of the mode selecting circuit 113 is reset by the POC signal, and outputs the switching signal "0" indicative of the RF mode to the data processing circuit 110. The mode of operation of the data processing circuit 110 is now set to the RF mode by default.

Operation of the IC card 1 in the terminal mode will be described below. When the IC card 1 is inserted into the wired card reader in the absence of undue electromagnetic noise, input signals are applied to the connection terminals 101–105 while no radio input signal is applied to the radio antenna 107.

The clock signal CLK, the drive electric power VDD, and the reset signal RESET_B thus start being applied to the corresponding connection terminals. As shown in FIG. 5, the reset signal RESET_B is initially "0". When the number of clock pulses of the clock signal CLK reaches 400 or more, the reset signal RESET_B is inverted to "1". When the drive electric power VDD under a predetermined voltage is applied to the connection terminal 103, the POC circuit 112 outputs a one-shot POC signal, which resets the counter 115 and the latch 116.

The latch 116 thus reset by the POC signal outputs the switching signal "0" indicative of the RF mode to the data processing circuit 110. At this time, because the reset signal RESET_B signal applied to the connection terminal 102 is "0", the data processing circuit 110 remains reset.

The counter 115 reset by the POC signal starts counting clock pulses of the clock signal CLK, and indicates a completion of the counting process to the latch 116 when it has counted 300 clock pulses of the clock signal CLK. When the completion of the counting process is indicated to the latch 116 after it has been reset by the POC signal, the latch 116 latches the reset signal RESET_B "1" inverted by the inverter 118, and outputs the latched reset signal as the switching signal "1" indicative of the terminal mode to the data processing circuit 110.

At this time, since the reset signal RESET_B applied to the connection terminal 102 is "0", the data processing circuit 110 remains reset. When the number of clock pulses of the clock signal CLK reaches 400 or more and the reset signal RESET_B is set to "1", the reset state of the data processing circuit 110 is canceled, and the data processing circuit 110 is set to the terminal mode by initial setting.

As described above, when the IC card 1 starts being supplied with electric power, it is set to the RF mode by default. Therefore, the IC card 1 can operate well in the RF mode depending on input signals. When both the reset signal RESET_B and the clock signal CLK are applied to the IC card 1, since the IC card 1 is switched to the terminal mode, the IC card 1 can operate well in the terminal mode depending on input signals.

Inasmuch as the clock signal CLK and the reset signal RESET_B applied respectively to the connection terminals 101, 102 can be detected without the need for an analog circuit such as a comparator, the control process for switching between the modes of operation of the data processing circuit 110 can be performed by only a digital circuit. Therefore, the IC card 1 has a clear-cut control process for switching between the two modes, and the control process is prevented from varying due to errors in the fabrication of the IC card 1.

For switching to the terminal mode depending on the reset signal RESET_B and the clock signal CLK, a certain number of clock pulses of the clock signal CLK are counted. As unwanted noise is not recognized as clock pulses of the clock signal CLK, the data processing circuit 110 is prevented from switching to the terminal mode due to such noise. Consequently, the control process for switching between the modes of operation of the data processing circuit 110 can be performed reliably.

According to the standards, the applied reset signal RESET_B is initially "0" for keeping the data processing circuit 110 reset. Since the mode selecting circuit 113 outputs the switching signal for the terminal mode to the data processing circuit 110 while the reset signal RESET_B is "0", the data processing circuit 110 can be operated in the terminal mode from the outset.

After the mode selecting circuit 113 has output the switching signal for the terminal mode to the data processing circuit 110, the mode selecting circuit 113 maintains the output switching signal until the application of the drive electric power VDD is stopped. Therefore, the mode of operation of the IC card 1 inserted in the wired card reader does not switch from the terminal mode to the RF mode, and hence the IC card 1 inserted in the wired card reader can operate stably in the terminal mode.

In the illustrated embodiment, the data processing device has been illustrated as the combined IC card 1. However, the principles of the present invention are also applicable to data processing devices other than the IC cards.

While a preferred embodiment of the present invention has been described using specific terms, such description is for illustrative purposes only, and it is to be understood that changes and variations may be made without departing from the spirit or scope of the following claims.

What is claimed is:

1. A data processing device, comprising
   a plurality of connection terminals for being individually supplied with signals, including processing data and a clock signal, and drive electric power;
   at least one radio antenna for receiving the signals and drive electric power as one radio wave;
   a data processing circuit switchable between a terminal mode, in which only the signals supplied to said connection terminals are effective, and an RF mode, in which only the radio wave supplied to said radio antenna is effective, said data processing circuit being supplied with the drive electric power and the signals; and
   a mode selecting circuit for setting said data processing circuit to the RF mode by default in response to the drive electric power starting to be supplied, and for switching said data processing circuit to the terminal mode in response to the clock signal being applied to a corresponding one of said connection terminals,
   wherein said mode selecting circuit comprises:
      clock counting means for counting clock pulses of the lock signal supplied in response to the drive electric power starting to be supplied; and
      input deciding means for outputting a switching signal to switch said data processing circuit to said terminal mode when said clock counting means has counted a predetermined number of clock pulses.

2. A data processing device according to claim 1, wherein said mode selecting circuit comprises mode maintaining means for applying the switching signal output by said input deciding means as a dummy clock signal to said clock counting means through a feedback loop.

3. A data processing device according to claim 2, wherein said mode selecting circuit includes a mode maintaining circuit for outputting the switching signal as the dummy clock signal.

4. A data process device according to claim 1, further comprising a power extracting circuit for extracting the drive electric power from the radio wave, and a power on clear circuit, responsive to the initial application of the drive electric power, for resetting said clock counter.

5. A data processing device according to claim 1, wherein:
   the signals supplied to said connection terminals further include a reset signal; and
   said mode selecting circuit also switches said data processing circuit to the terminal mode in response to the reset signal being applied to a second corresponding one of said connection terminals.

6. A data processing device according to claim 5, wherein said input deciding means comprises data output means for outputting the reset signal as the switching signal when said clock counting means has counted a predetermined number of clock pulses.

7. A data processing device, comprising:
   a plurality of connection terminals for being individually supplied with signals, including processing data and a clock signal, and drive electric power;
   at least one radio antenna for receiving the signals and the drive electric power as one radio wave;
   a data processing circuit switchable between a terminal mode in which only the signals supplied to said connection terminals are effective, and an RF mode, in which only the radio wave supplied to said radio antenna is effective, said data processing circuit being supplied with the drive electric power and the signals; and
   a mode selecting circuit for setting said data processing circuit to the RF mode by default in response to the drive electric power starting to be supplied, and for switching said data processing circuit to the terminal mode in response to the clock signal being applied to a corresponding one of said connection terminals, wherein:
   the signals supplied to said connection terminals further include a reset signal;
   said mode selecting circuit also switches said data processing circuit to the terminal mode in response to the reset signal being applied to a second corresponding one of said connection terminals, and
   said mode selecting circuit comprises:
      a clock counter responsive to the initial application of the drive electric power for counting clock pulses of the clock signal supplied to the respective one of said connection terminals; and said input deciding circuit is responsive to said clock counter counting a predetermined number of clock pulses, for providing the reset signal as the switching signal.

8. A data processing device according to claim 7, wherein said mode selecting circuit provides the switching signal as a dummy clock signal to said clock counter.

9. A data processing device, comprising
a plurality of connection terminals adapted to be supplied respectively with signals, including processing data and a clock signal, and drive electric power;
at least one radio antenna for receiving processing data and drive electric power in a radio wave;
a data processing circuit switchable between a terminal mode, in which only the signals supplied to said connection terminals are effective, and an RF mode, in which only the radio wave supplied to said radio antenna is effective, said data processing circuit being supplied with the drive electric power and the signals; and
a mode selecting circuit responsive to initial application of the drive electric power to said data processing device for setting said data processing circuit to the RF mode, and further responsive to receipt of the clock signal for applying a switching signal to said data processing circuit to switch said data processing circuit to the terminal mode, wherein said mode selecting circuit comprises:
a clock counter responsive to the initial application of the drive electric power for counting clock pulses of the clock signal supplied to the respective one of said connection terminals; and
an input deciding circuit responsive to said clock counter counting a first predetermined number of clock pulses, for outputting a switching signal to switch said data processing circuit to the terminal mode.

10. A data processing device according to claim 9, wherein said mode selecting circuit provides the switching signal as a dummy clock signal to said clock counter.

11. A data processing device according to claim 10, wherein said mode selecting circuit includes a mode maintaining circuit for outputting the switching signal as the dummy clock signal.

12. A data processing device according to claim 9, further comprising a power extracting circuit for extracting the drive electric power from the radio wave, and a power on clear circuit, responsive to the initial application of the drive electric power, for resetting said clock counter.

13. A data processing device according to claim 9, wherein said mode selecting circuit provides the switching signal as a dummy clock signal to said clock counter.

14. A data processing device according to claim 9, wherein:
the signals supplied to said connection terminals further include a reset signal; and
said mode selecting circuit also switches to the terminal mode in response to the reset signal being applied to a second corresponding one of said connection terminals.

15. A data processing device according to claim 14, wherein said input deciding circuit is responsive to said clock counter counting a second predetermined number of clock pulses, for providing the reset signal as the switching signal.

16. A data processing device, comprising:
a plurality of connection terminals adapted to be supplied respectively with signals, including processing data and a clock signal, and drive electric power;
at least one radio antenna for receiving processing data and drive electric power in a radio wave;
a data processing circuit switchable between a terminal mode, in which only the signals supplied to said connection terminals are effective, and an RF mode, in which only the radio wave supplied to said radio antenna is effective, said data processing circuit being supplied with the drive electric power and the signals; and
a mode selecting circuit responsive to initial application of the rive electric power to said data processing device for setting said data processing circuit to the RF mode, and further responsive to receipt of the clock signal indicating elapsing of predetermined period of time for applying a switching signal to said data processing circuit to switch said data processing circuit to the terminal mode, wherein:
the signals supplied to said connection terminals further include a reset signal;
said mode selecting circuit also switches said data processing circuit to the terminal mode in response to the reset signal being applied to a second corresponding one of said connection terminals, and said mode selecting circuit comprises:
a clock counter responsive to the initial application of the drive electric power for counting clock pulses of the clock signal supplied to the respective one of said connection terminals; and
said input deciding circuit is responsive to aid clock counter counting a second predetermined number of clock pulses, for providing the reset signal as the switching signal.

* * * * *